(12) United States Patent
Stark et al.

(10) Patent No.: US 9,979,488 B2
(45) Date of Patent: May 22, 2018

(54) DOWNHOLE FIBER OPTIC QUADRATURE MODULATION

(71) Applicant: HALLIBURTON ENERGY SERVICES, INC., Houston, TX (US)

(72) Inventors: Daniel Joshua Stark, Houston, TX (US); Aaron Michael Fisher, Kingwood, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days. days.

(21) Appl. No.: 15/316,588

(22) PCT Filed: Feb. 12, 2016

(86) PCT No.: PCT/US2016/017845
§ 371 (c)(1),
(2) Date: Dec. 6, 2016

(87) PCT Pub. No.: WO2017/138959
PCT Pub. Date: Aug. 17, 2017

(65) Prior Publication Data
US 2018/0041284 A1 Feb. 8, 2018

(51) Int. Cl.
*H04B 10/50* (2013.01)
*H04B 10/25* (2013.01)
(Continued)

(52) U.S. Cl.
CPC ......... *H04B 10/505* (2013.01); *E21B 47/123* (2013.01); *H04B 10/25* (2013.01); *H04B 10/5161* (2013.01)

(58) Field of Classification Search
CPC .. H04B 10/505; H04B 10/25; H04B 10/5161; E21B 47/123
(Continued)

(56) References Cited

U.S. PATENT DOCUMENTS

| 6,046,838 A | 4/2000 | Kou et al. |
| 7,116,460 B2 | 10/2006 | Griffin |

(Continued)

FOREIGN PATENT DOCUMENTS

| EP | 0496298 A2 | 7/1992 |
| EP | 1096273 A2 | 5/2001 |

(Continued)

OTHER PUBLICATIONS

Fatadin et al., Laser Linewidth Tolerance for 16-QAM Coherent Optical Systems Using QPSK Partitioning, IEEE Photonics Technology Letters, vol. 22, No. 9, May 1, 2010, U.K.

(Continued)

*Primary Examiner* — Leslie C Pascal
(74) *Attorney, Agent, or Firm* — Polsinelli PC

(57) ABSTRACT

A system for downhole fiber optic quadrature modulation. A system located at the surface generates a coherent laser light at a surface location, splits the coherent laser light at the surface location, and outputs the part of the signal to a modulation unit located at a downhole location. The modulation unit performs an optical phase modulation and an optical amplitude modulation on the downhole signal using downhole data before sending the signal back. The system receives, at the surface location, a phase and amplitude modulated downhole signal based on the downhole data from the modulation unit, mixes the phase and amplitude modulated downhole signal to the surface signal, and demodulates the resulting difference signal to extract the downhole data.

20 Claims, 10 Drawing Sheets

(51) Int. Cl.
    *H04B 10/516*    (2013.01)
    *E21B 47/12*    (2012.01)

(58) Field of Classification Search
    USPC .................................................. 398/168–170
    See application file for complete search history.

(56) References Cited

U.S. PATENT DOCUMENTS

| | | |
|---|---|---|
| 7,394,992 B2 | 7/2008 | Kimmitt et al. |
| 8,164,477 B2 | 4/2012 | Li |
| 8,362,916 B2 | 1/2013 | Tjhang et al. |
| 8,581,742 B2 | 11/2013 | Viswanathan et al. |
| 8,654,832 B1 | 2/2014 | Hansen et al. |
| 9,000,942 B2 | 4/2015 | Atkinson et al. |
| 2004/0208644 A1 | 10/2004 | Sirat et al. |
| 2011/0290992 A1 | 12/2011 | Sato et al. |
| 2014/0193152 A1 | 7/2014 | Zhou et al. |

FOREIGN PATENT DOCUMENTS

| | | |
|---|---|---|
| WO | 2014043007 A1 | 3/2014 |
| WO | 2015065479 A1 | 5/2015 |
| WO | 2015171135 A1 | 11/2015 |

OTHER PUBLICATIONS

Culshaw, Brian, Fiber Optics in Sensing and Measurement, IEEE Journal of Selected Topics in Quantum Electronics, vol. 6, No. 6, Nov./Dec. 2000, Scotland.

International Search Report and Written Opinion; PCT Application PCT/US2016/017845; dated Oct. 27, 2016.

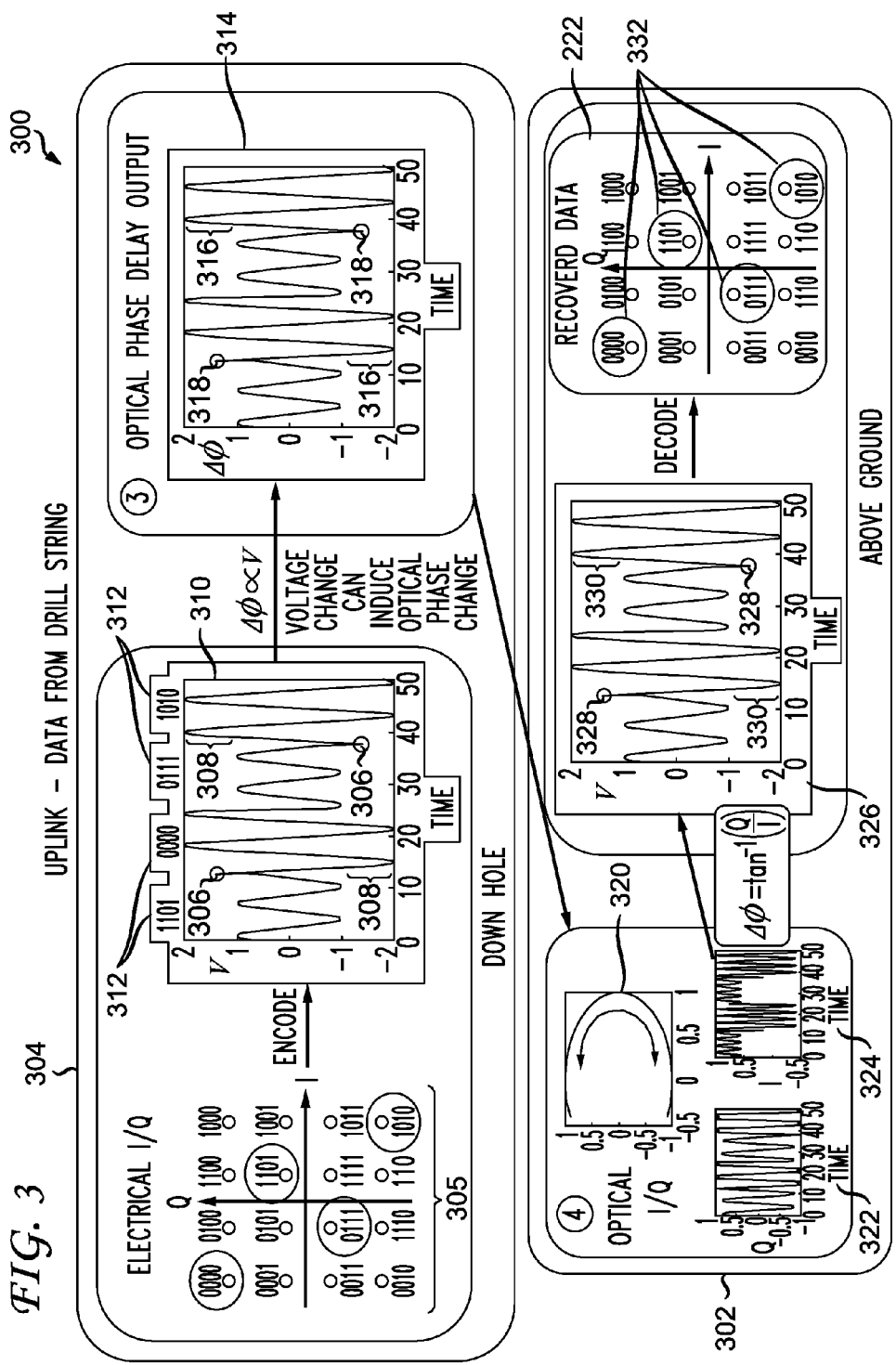

DOWNHOLE FIBER OPTIC QUADRATURE MODULATION

CROSS-REFERENCE TO RELATED APPLICATIONS

This application is a national stage entry of PCT/US2016/017845 filed Feb. 12, 2016, said application is expressly incorporated herein in its entirety.

TECHNICAL FIELD

The present disclosure relates to fiber optic communications in oil and gas operations, and more specifically to performing amplitude and phase modulation on fiber optic signals being communicated between two locations, such as a surface location and a downhole location

BACKGROUND

Modulation of a periodic waveform involves modifying a property of the waveform to contain information a user wishes to convey. Two well-known forms of modulation are those used in radio, AM (Amplitude Modulation) and FM (Frequency Modulation). In AM radio, a carrier signal (such as a baseline radio wave) is modified by increasing or decreasing the amplitude of the carrier signal over time, where data is communicated by how much the amplitude is raised. In FM radio, the frequency of the carrier signal varies over time, and based on those frequency changes a user's radio can decode the information being sent. All communications involve some form of modulation to convey information; however, the mediums used for communications can dictate the speed of the communication, as well as how much information can be communicated.

In oil and gas extraction, communicating with the tools located downhole can be critical to operations because knowing the types of rock formations, pressures, temperatures, etc., can affect not only drilling speed, but also surface readiness, planning, and capacity. A common means for communicating with downhole tools is mud-pulse telemetry (i.e., modulating the mud column in the well), which often has data rates as low as 10 bits per second (bps) and is generally slower than the collection of data by the downhole tool. As a result, any data collected and not yet transferred to the surface must be stored on storage devices located on the tool for future transmission, leading to increased power consumption and tool complexity.

BRIEF DESCRIPTION OF THE DRAWINGS

FIG. 3 illustrates transmission of an optically modulated signal to a surface location;

DETAILED DESCRIPTION

Various embodiments of the disclosure are described in detail below. While specific implementations are described, it should be understood that this is done for illustration purposes only. Other components and configurations may be used without parting from the spirit and scope of the disclosure, and characteristics/configurations of the exemplary implementations provided are not exclusive to the implementation in which they are presented.

A system, method and computer-readable storage devices are disclosed which provide a mechanism for real-time data transmission between surface and down-hole tools using fiber-optic telemetry. The fiber-optic telemetry disclosed herein uses a combination of optical phase and amplitude modulations. By combining the two types of modulation on an optical signal, the potential data rate can greatly increase, with data rates potentially exceeding 1000 Mbps.

While many of the concepts disclosed herein are specific to downhole operations, it is noted that many of the concepts disclosed herein can also be applied to increase data rates of all fiber optic communications.

An exemplary system configured according to this disclosure generates a coherent laser light at a surface location, and splits the coherent laser light at the surface location, to yield a surface signal and a downhole signal. The surface signal remains at the surface, while the system outputs the downhole signal to a modulation unit located at a downhole location. The modulation unit performs both optical phase modulation and optical amplitude modulation on the downhole signal using downhole data and outputs the modulated optical signal (containing the downhole data) back to the surface. The system then receives, at the surface location, the phase and amplitude modulated downhole signal having the downhole data from the modulation unit, and interprets the modulated downhole signal based on light intensity and phase as compared to the surface signal. Finally, the system demodulates the differences identified by the interpretation to extract the downhole data.

The uplink signal can be mixed interferometrically with the surface signal. The resulting optical outputs (after they are converted to an electronic signal using balanced photoreceivers) can correspond to in-phase and quadrature waveforms. These waveforms are what are demodulated to obtain bit data.

Other exemplary systems can output data from the surface to the downhole tool or cover other aspects of downhole communications, such as intermediate stages with a communication link. Additional details and examples, as well as details regarding phase and amplitude modulation of optical signals, will be provided below. The disclosure now turns to a description of the Figures provided.

Figure 1A:
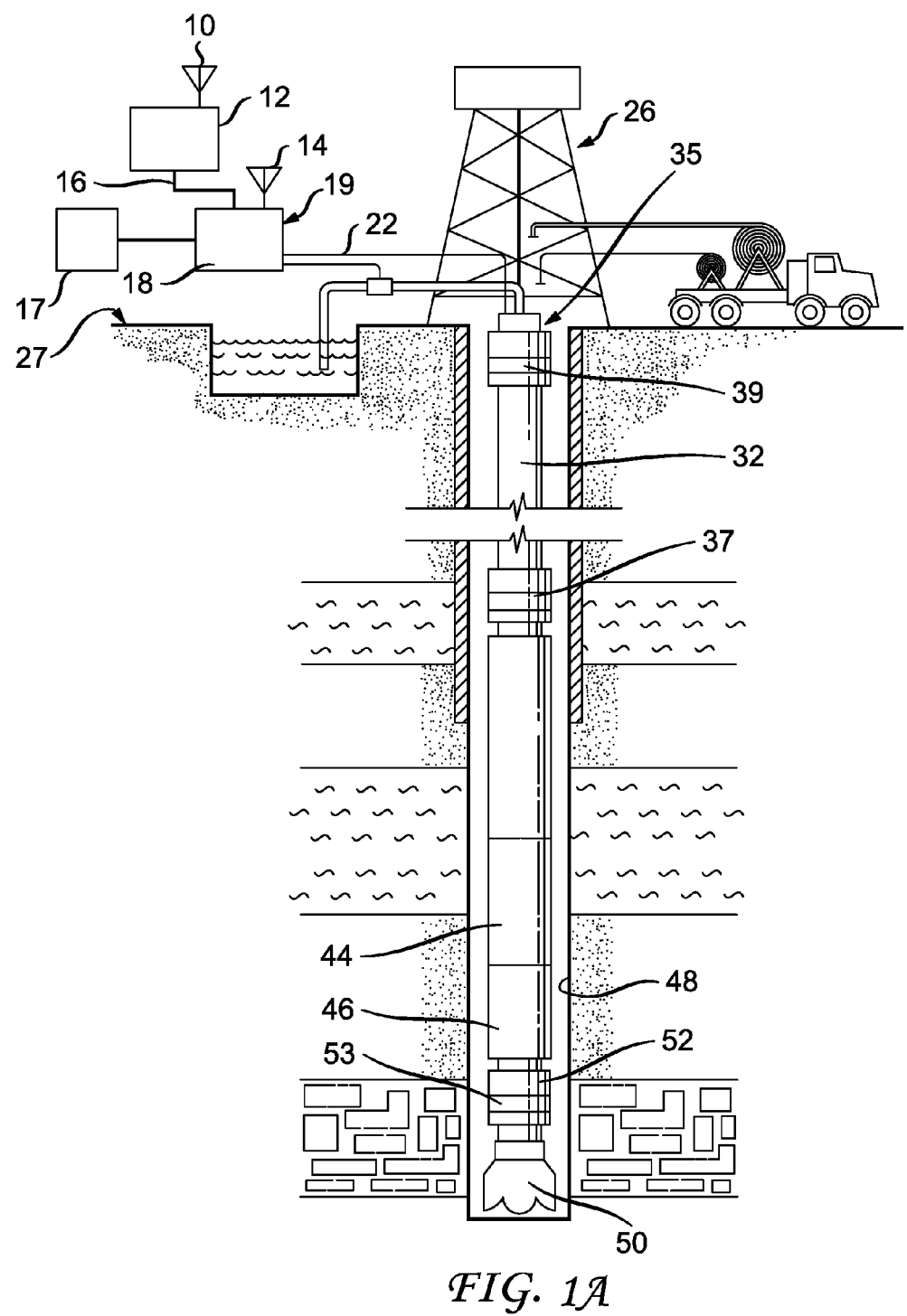
FIG. 1A illustrates a schematic diagram of a system for well logging while drilling a wellbore.

As shown in FIG. 1A, the drill string 32 supports several components along its length. A sensor sub-unit 52 is shown for detecting conditions near the drill bit 50, conditions which can include such properties as formation fluid density, temperature and pressure, and azimuthal orientation of the drill bit 50 or string 32. Additionally, measurement while drilling (MWD)/logging while drilling (LWD) procedures are supported both structurally and communicatively. The fiber optic communications as disclosed herein can be suitably employed for wireline communication operations of MWD, LWD, slickline, and/or coiled tubing configurations, and can be conducted by fiber optic cable located within the well bore 48 or within the drill string 32. The sensor sub-unit 52 can detect characteristics of the formation surrounding the wellbore 48 proximate the sensor sub-unit 52 such as resistivity and porosity. Other sensor sub-units 35 are shown within the cased portion of the well which can be similarly enabled to sense nearby characteristics and conditions of the drill string, formation fluid, casing and surrounding formation. Regardless of which conditions or characteristics are sensed, data indicative of those conditions and characteristics is either recorded downhole, for instance at the processor 44 for communication to the surface by fiber optic communications as disclosed herein. The data can be sent to a local processor 18 where the data may be either processed or further transmitted along to a remote processor 12 via wire 16 or wirelessly via antennae 14 and 10.

The sensor sub-unit 52 is located along the drill string 32 above the drill bit 50. The sensor sub-unit 52 can carry a signal processing apparatus 53 for transmitting, receiving, modulating, and otherwise processing signals passing along drill string 32 to and from the surface 27. Additional sensor sub-units 35 can be included as desired in the drill string 32. The sensor sub-unit 52 positioned below the motor 46 has apparatus 53 to communicate with the sensor sub-unit 36 in order to relay information to the surface 27. Communication between the apparatus 53 below the motor 46 and the downhole apparatus 37 of the sensor sub-unit 36 can be accomplished by use of a short hop telemetry system or by the fiber optic cabling, or other commercially suitable communication means.

At the surface 27, supported by the drill string 32, a surface sensor sub-unit 35 carries apparatus 39. The surface sensor sub-unit 35 can be supported also by the surface rig 26. Fiber optic signals received at the apparatus 39 may be processed within the apparatus 39 or sent to a surface installation 19 via a communication path 22 for processing.

As shown in FIG. 1A, the surface installation 19 includes a transceiver (antennae) 14 that can communicate with the surface sensor sub-unit 35, the personal computer 18 coupled to the transceiver 14 for processing the signals from the sensor sub-units 35, 52, and a real-time clock 17 for time-stamping signals and sensor data from the sensor sub-units. Power for the sensor sub-units and communication apparatuses in the sub-units may be provided as is known in the art.

Figure 1B:
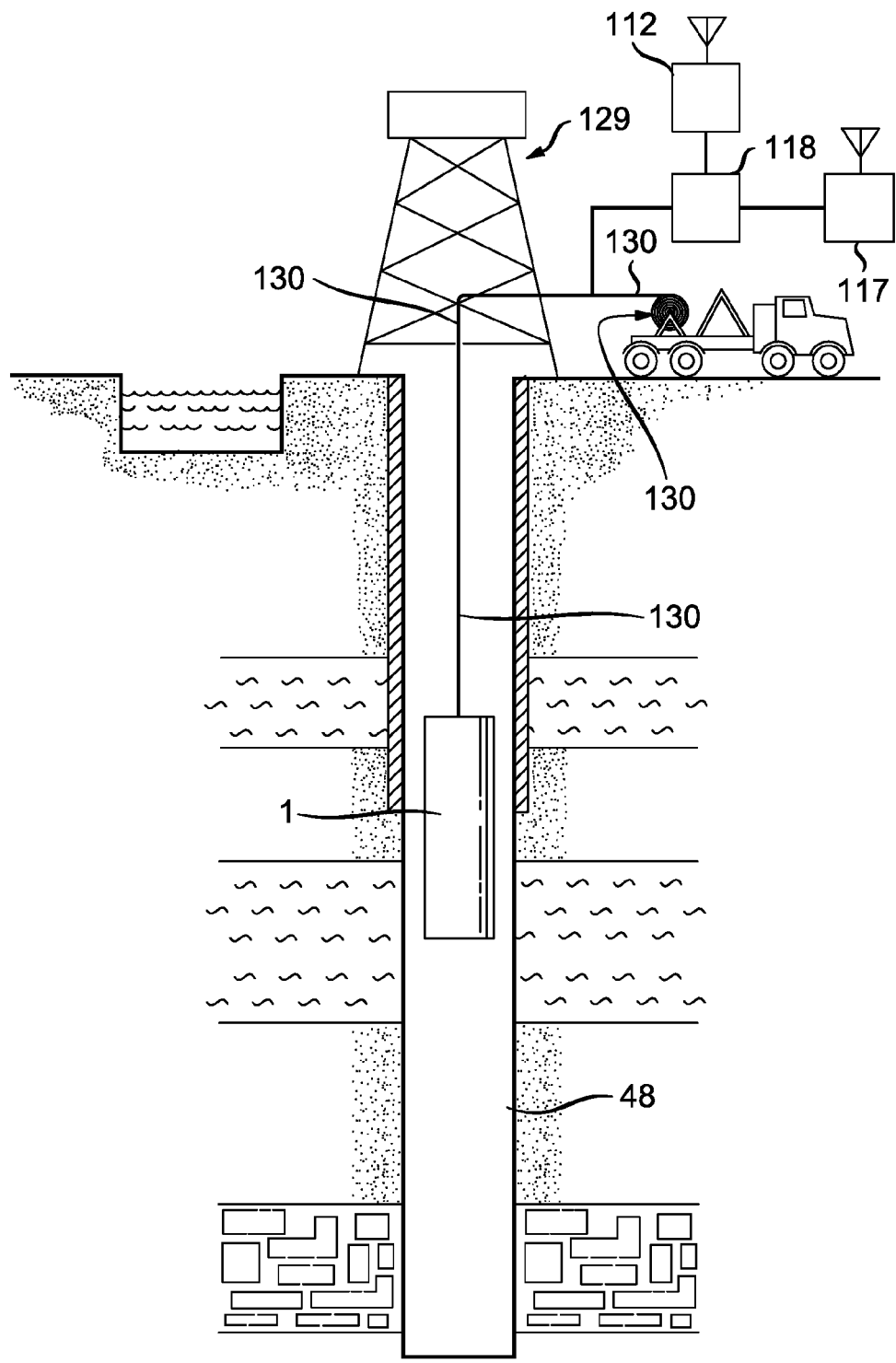
FIG. 1B illustrates an example wireline environment for fiber optic communications with a downhole tool.

As illustrated in FIG. 1B, a tool having tool body 1 can be employed with "wireline" systems, in order to carry out logging or other operations. For example, instead of using the drill string 32 of FIG. 1A to lower tool body 1, which may contain sensors or other instrumentation for detecting and logging nearby characteristics and conditions of the wellbore and surrounding formation, tool body 1 can be lowered into the wellbore 48 by wireline conveyance 130 as shown in FIG. 1B. The wireline conveyance 130 can be anchored in the drill rig 129 or portable means such as a truck. The wireline conveyance 130 can be one or more wires, slickline, cables, or the like, as well as tubular conveyances such as coiled tubing, joint tubing, or other tubulars. The illustrated wireline conveyance 130 provides support for the tool, as well as enabling communication between the tool processors on the surface and providing a power supply. The wireline conveyance 130 can include fiber optic cabling for carrying out communications. The wireline conveyance 130 is sufficiently strong and flexible to tether the tool body 1 through the wellbore 48, while also permitting communication through the wireline conveyance 130 to local processor 118 and/or remote processors 112, 117. Additionally, power can be supplied via the wireline conveyance 130 to meet power requirements of the tool. For slickline or coiled tubing configurations, power can be supplied downhole with a battery or via a downhole generator.

The disclosure now turns to a discussion of phase and amplitude modulation. Phase and amplitude modulation represent the two primary methods by which data may be modulated onto an optical waveform (although or modulation methods, such as frequency modulation, can also be applied). Phase modulators adjust the phase of the electromagnetic field having an optical signal in response to an applied voltage (proportionally for most commercially available electro-optic devices). For example, the phase of a sine wave can be adjusted by 0° or 180° with exposure to an appropriate voltage, thereby generating a substantially different waveform than a pure sine wave. The adjusted portions can, for example, represent "1" bits in a data stream, whereas unadjusted portions can represent "0" bits in the data stream. The resulting waveform, which will be a mixture of adjusted phase adjusted segments and non-phase-adjusted (i.e., original) segments can then be mixed with a reference signal to deduce/interpret the original bit stream.

To deduce the original bit stream, two auxiliary signals, generated from the aforementioned mixing, can be used. One signal is in-phase (I) with the reference signal, and a second signal is shifted 90° out of phase with the reference signal, the second signal being referred to as Quadrature (Q). Plotting I against Q yields a lissajous whose angle at each point, $\Delta \varphi$, is directly related to the phase. The deduced phase reproduces the original bit stream.

Amplitude modulators adjust the intensity of an optical signal based on an applied voltage (through a cosine dependence for most commercially available electro-optic modulators). To deduce the original bit stream, the optical signal's intensity is converted into a measureable electrical signal (using an optical to electrical converter, or O/E converter), which can be analyzed through traditional electronic methods. Exemplary optical to electrical converters include a photodiode, a photomultiplier tube, quantum dot photoconductors, phototransistors, nanowire photodetectors, graphene composite photodetectors, carbon nanotube photodiodes, photovoltaics, HgCdTe detectors, photo resistors, cryogenic detectors, active pixel sensors, charge-coupled devices, etc. If the amplitude is modulated while the phase is being modulated, the radius of the resulting lissajous would directly relate to the modulated amplitude. A direct correlation can exist between the number of levels in an amplitude modulated waveform and a number of levels in a resulting lissajous, with a duration in an electrical level corresponding to a duration of a signal.

To modulate both the phase and the amplitude of an optical signal (thereby creating an inphase-quadrature (I/Q) signal), the fiber optic signal is separately amplitude modulated and phase modulated using electro-optical modulators. Normally, the amplitude and the phase will be modulated at the same symbol frequency. For example, if the amplitude is modulated for every four bits in the bitstream, the phase would similarly be modulated for the same four bits. However, if desired, the symbol frequency used for modulating phase and amplitude can vary, such that the number of bits being respectively modulated are distinct between the amplitude and phase modulations.

Exemplary optical phase and optical amplitude modulators can include a lithium niobate phase modulator, a lithium niobate amplitude modulator, Pockels cells, variable optical attenuators, semiconductor optical amplifiers, phase delay plates, liquid crystals, interferometers, optical switches, electro-optic material (such as potassium titanyl phosphate), any combination thereof, and/or any other modulation tool known to those of skill in the art, can be used to create an I/Q signal.

The total number of bits available in any I/Q system when using binary encoding can be calculated first from the number of symbols $N_{sym}$ available.

$$N_{sym} = 2^{b_{ph}} \times 2^{b_{ampl}}$$

where $b_{ph}$ is the number of phase bits and $b_{ampl}$ is the number of amplitude bits in the system. The total number of bits $b=b_{ph}+b_{ampl}$. Using the total number of bits available in the system with the symbol rate $f_s$, the gross bit rate R is $R=f_s b$. Table 1 provides example data rates if binary based modulation is used.

TABLE 1

| $F_s$(MHz) | $N_{sym}$ | Phase Waveform Levels | $b_{ph}$ | Amplitude Waveform Levels | $b_{ampl}$ | Total Data Rate (Mbps) |
|---|---|---|---|---|---|---|
| 10 | 2 | 2 | 1 | 1 | 0 | 10 |
| 50 | 4 | 4 | 2 | 1 | 0 | 100 |
| 100 | 8 | 8 | 3 | 1 | 0 | 300 |
| 200 | 16 | 16 | 4 | 1 | 0 | 800 |
| 300 | 16 | 8 | 3 | 2 | 1 | 1200 |
| 300 | 64 | 8 | 3 | 8 | 3 | 1800 |
| 300 | 256 | 16 | 4 | 16 | 4 | 2400 |
| 300 | 1024 | 32 | 5 | 32 | 5 | 3000 |

As illustrated in Table 1, the greater the number of symbols that can be output, the greater the total data rate. Utilizing both amplitude and phase modulation for quadrature modulation therefore leads to a much higher data rate.

Figure 2:
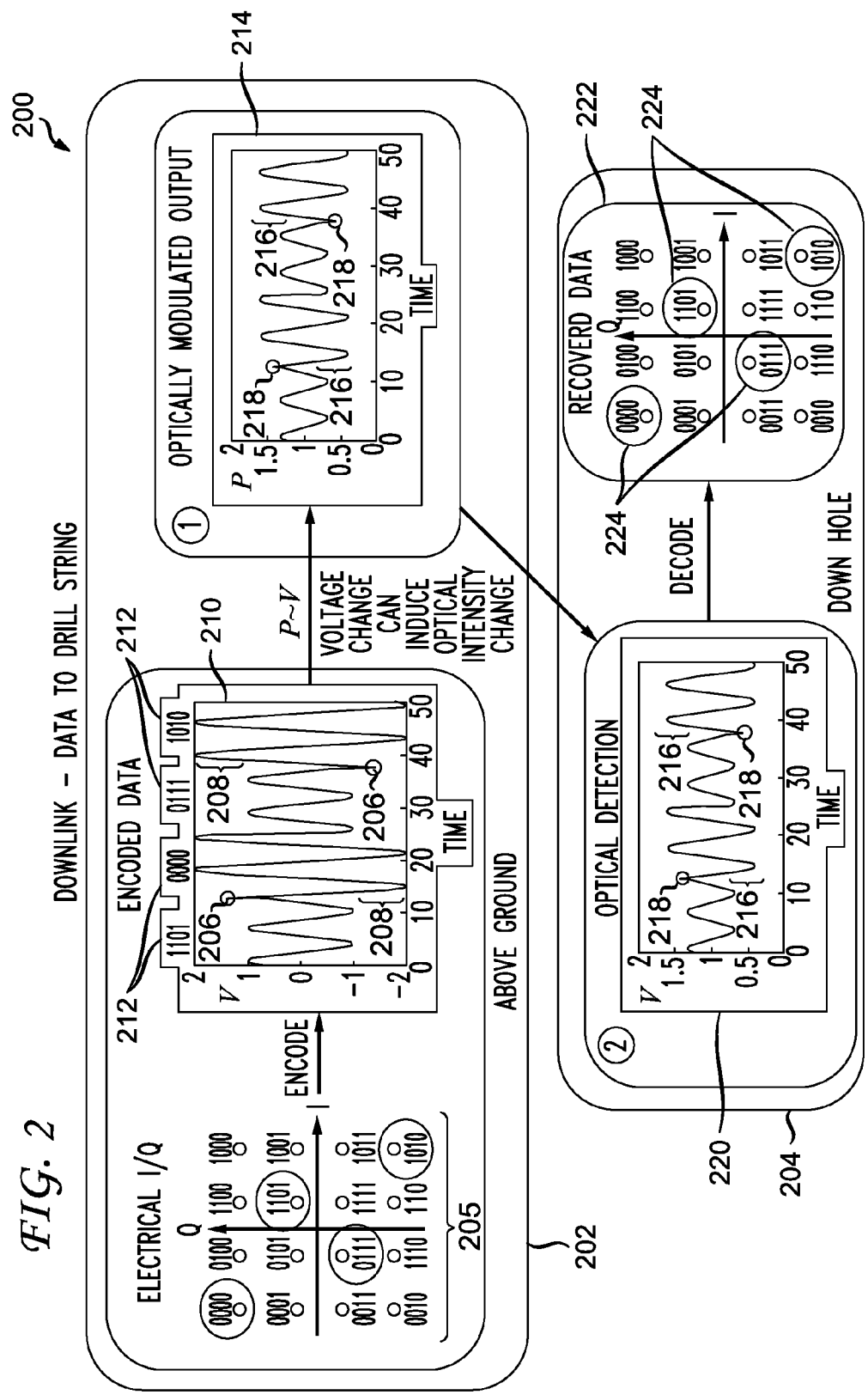
FIG. 2 illustrates transmission of an optically modulated signal to a downhole location.

Having generally discussed amplitude and phase modulation, the disclosure returns to the Figures provided. FIG. 2 illustrates transmission 200 of an optically modulated signal from a surface location 202 to a downhole location 204. As illustrated, bits within a bitstream are encoded into a waveform 210 based on the individual values of the bits received. For example, as a stream of data is received, bits within the stream are compared to pre-defined modulation parameters 205. In this example, the pre-defined modulation parameters use a symbol frequency of four bits, identifying for every four bits of the data stream an amplitude and phase which correspond to the bits received. A waveform 210 is generated using amplitude and phase for the corresponding bits (according to the pre-defined modulation parameters 205), with the bits 212 of the bitstream corresponding to corresponding portions of the generated waveform 210. As illustrated, there are distinct amplitudes 208 and phases 206 within the generated waveform, corresponding to distinct amplitudes and phases in the pre-defined modulation parameters 205.

The generated waveform 210 is then converted to an optically modulated output 214, where voltage change in the generated form 210 can induce an optical intensity change (and/or an optical phase change) in the optically modulated output 214. The generated optical waveform has optical intensity variations 216 which are based on the amplitude variations 208 of the encoded waveform 210. The optically modulated output 214 is output, via fiber optic cable, from a surface location 202 to a downhole location 204 where it is received 220, maintaining the amplitude 216 and phase 206 distinctions. The optical waveform 220 is decoded, resulting in recovered data 222 with individual pieces of data 224 corresponding to the original bits 212 of the surface bitstream.

FIG. 3 illustrates transmission 300 of an optically modulated signal from a downhole location 304 to a surface location 302. As in FIG. 2, bits within a bitstream are encoded into a waveform 310 based on the individual values of the bits received. For example, as data is received and is ready to be communicated to the surface, a data stream is created. Bits within the stream are compared to pre-defined modulation parameters 305. In this example, the pre-defined modulation parameters 305 use a symbol frequency of four bits, identifying for every four bits of the data stream an amplitude and phase which correspond to the bits received. A waveform 310 is generated using amplitude and phase as identified in the pre-defined modulation parameters 305, with the bits 312 of the bitstream corresponding to corresponding portions of the generated waveform 310. As illustrated, there are distinct amplitudes 308 and phases 306 within the generated waveform, corresponding to distinct amplitudes and phases in the pre-defined modulation parameters 305.

The generated waveform 310 is then converted to an optically modulated output 314, where voltage change in the generated form 310 can induce an optical phase change (and/or an optical intensity change) in the optically modulated output 314. The generated optical waveform has optical intensity variations 316 which are based on the amplitude variations 318 of the encoded waveform 310. The optically modulated output 314 is output, via fiber optic cable, from a downhole location 304 to a surface location 302 where it is received 320, 326, maintaining the amplitude 330 and phase 328 distinctions. The optical waveform 326 can be decoded by comparing the received optical waveform 326 to In-phase (I) 324 and Quadrature (Q) 322 components, resulting in recovered data with individual pieces of data 332 corresponding to the original bits 312 of the downhole bitstream.

Figure 4A:
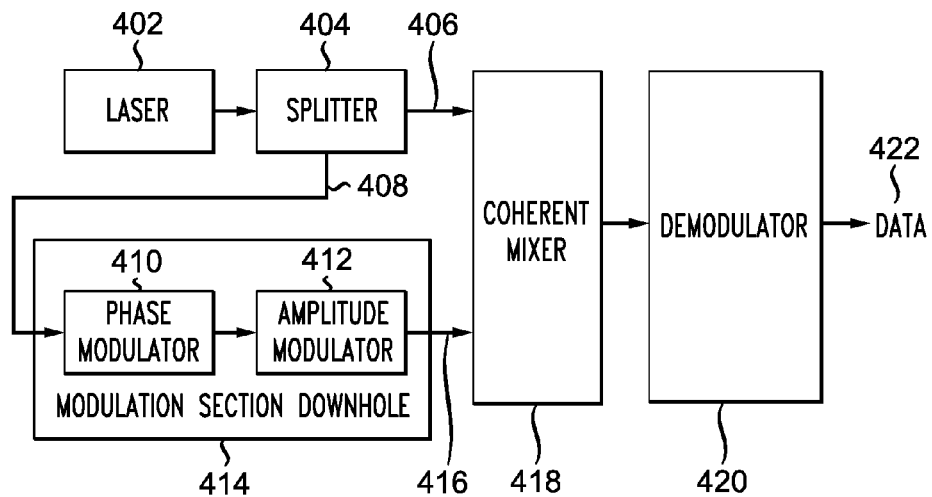
FIGS. 4A and 4B illustrate system architecture designs to implement phase and amplitude modulation.
Figure 4B:
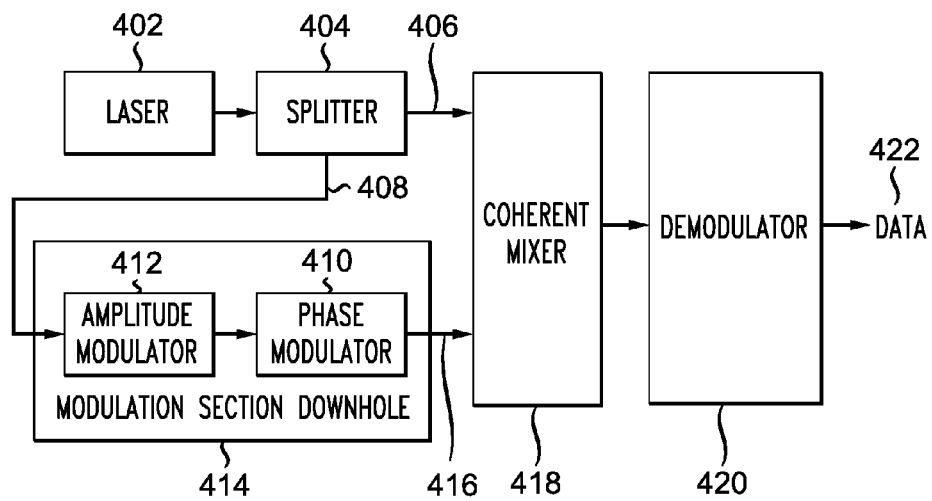

FIGS. 4A and 4B illustrate system architecture designs to implement phase and amplitude modulation. As illustrated, the architectures are identical except for the relative positions of the phase modulator 410 and the amplitude modulator 412. In the illustrated systems, the laser 402 generates a coherent laser light which is split, at the splitter 404, along two paths. Along one path, the light stays at the surface 406 (or downhole) and acts as a local oscillator. Along the other path 408, the light travels downhole (or to the surface), is modulated 414, and returns to the surface (or returns downhole) as a modulated signal 416. The modulated signal 416 and the local oscillator signal 406 are mixed in the coherent mixer 418, demodulated 420, from which data is retrieved 422. In FIG. 4A, the modulation section 414, or unit, the phase modulator 410 occurs first with the amplitude modulator 412 occurring second. In FIG. 4B, the amplitude modulator 412 occurs first and the phase modulator 410 occurs second. In another configuration, one could split the optical signal before entering the coherent mixer and demodulate the amplitude and phase modulations of the signal individually. The amplitude modulation could go directly to an O/E converter and the phase modulation could continue to the coherent mixer. In addition, while modulation can occur in the same tools as data encoding tools, in certain configurations the modulation/encoding capacities can be in distinct tools. These tools can encode the same data, or can encode different data as well. For example, temperature data could be encoded with amplitude modulation in one tool and then be passed to a second tool that measure pressure and encodes these values with phase modulation in a second tool. Which configuration is implemented can be based on specific circumstances and needs of a user. The configuration can also be adjustable, such that if a user determines the overall system would benefit from changing which type of modulation occurs first, the system can change the order. Such implementation can occur, for example, if the modulations are occurring via a processor, or if there is adjustable signal routing within the modulation unit 414. While these modulators would likely be in the same tool and encode data generated by the same data telemetry system, they also may be in different tools, or encode different data as well. For example, temperature data could be encoded with amplitude modulation in one tool and then be passed to a second tool which measures pressure for additional modulation.

Figure 5:
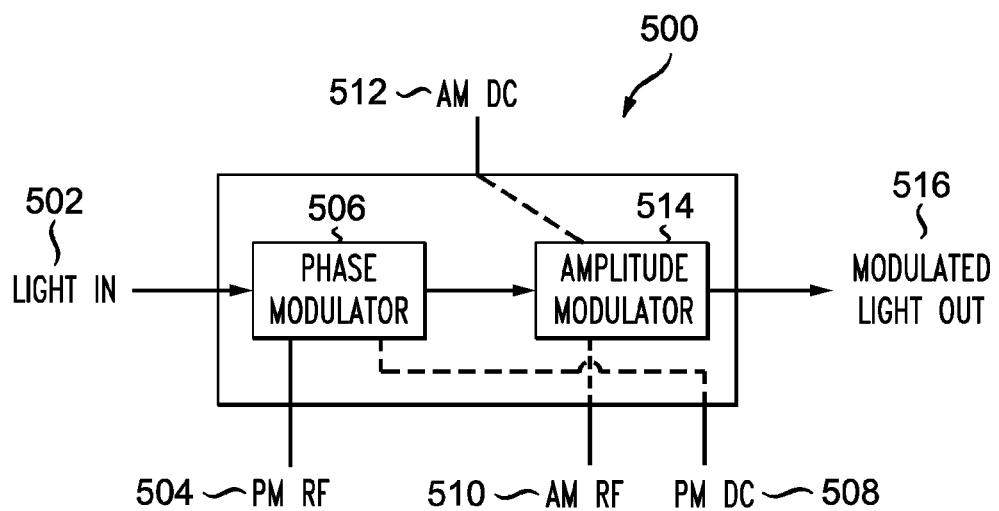
FIG. 5 illustrates a chip with integrated amplitude and phase modulators.

FIG. 5 illustrates a chip with integrated amplitude and phase modulators into a single monolithic piece. As illustrated, the light 502 passes from a phase section 506 of the chip 500 and can be directly guided into an amplitude section 514 of the chip 500, forming a single integrated monolithic structure. This design reduces loss from connection between modulators, reduces sensitivity to polarization and vibration, and greatly reduces the form factor of the final device. Inputs to the phase modulator 506 include a phase modulation RF wave 504 and a phase modulation voltage input 508. Inputs to the amplitude modulator 514 include an amplitude modulation RF wave 510 and an amplitude modulation voltage input (i.e., a DC bias voltage) 512. The DC bias voltage can, for example, stabilize the mid-point of a cosine curve within the RF wave.

Using an integrated monolithic structure as illustrated can help reduce drift which occurs as an optical signal travels to and from a downhole location. Specifically, drift within a pilot signal can occur as temperature variations, kinks in the line, vibration, and other factors cause the pilot signal to warp. Reducing the number of connections needed, and therefore reducing the points at which drift can occur, therefore offer significant benefits in downhole fiber optic communications.

In addition, the amplitude modulator 514, in this and any of the configurations disclosed herein, can be adapted based on specific downhole conditions. For example, if the temperature at a certain depth within a wellbore has increased to the point where an initial amplitude modulation is no longer effective, the system can configure the amplitude modulator 514 to provide either an increased amplitude output when modulating the signal, or decrease/cease amplitude modulation while those conditions persist. In addition, the bias voltage 512 can be adjusted to compensate for temperature effects on amplitude modulation. In circumstances, such as those described, where the amplitude modulation decreases, the modulation scheme used for phase modulation can be altered to compensate for the reduced ability to output amplitude modulation data.

The above descriptions made use of a phase modulator to introduce the quadrature (Q) component to the signal. It is also possible to introduce this component by projecting the effective signal purely onto the amplitude. This may be done two ways. First, with a single amplitude modulator, when operating in the linear regime of the modulator, a signal equal to the projection of the phasor may be encoded through the projection of the phase onto the real numbers, namely:

signal=$Re[\mathrm{Exp}(i*\mathrm{phase})]$

For example, in a 2-bit system, the four possible signals, at a rate of omega, that could be sent are:
sin(omega*t)+cos(omega*t)
sin(omega*t)−cos(omega*t)
−sin(omega*t)+cos(omega*t)
−sin(omega*t)−cost(omega*t)

Figure 6A:
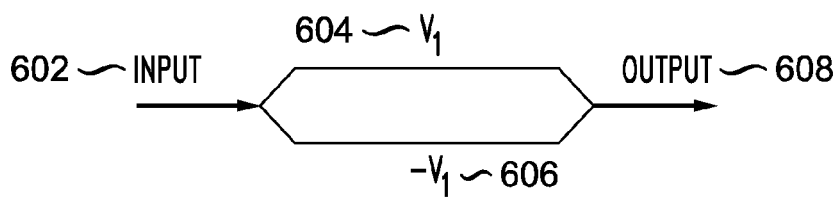
FIGS. 6A, 6B, and 6C illustrate exemplary architectures for quadrature phase shift keying using amplitude modulation.
Figure 6B:
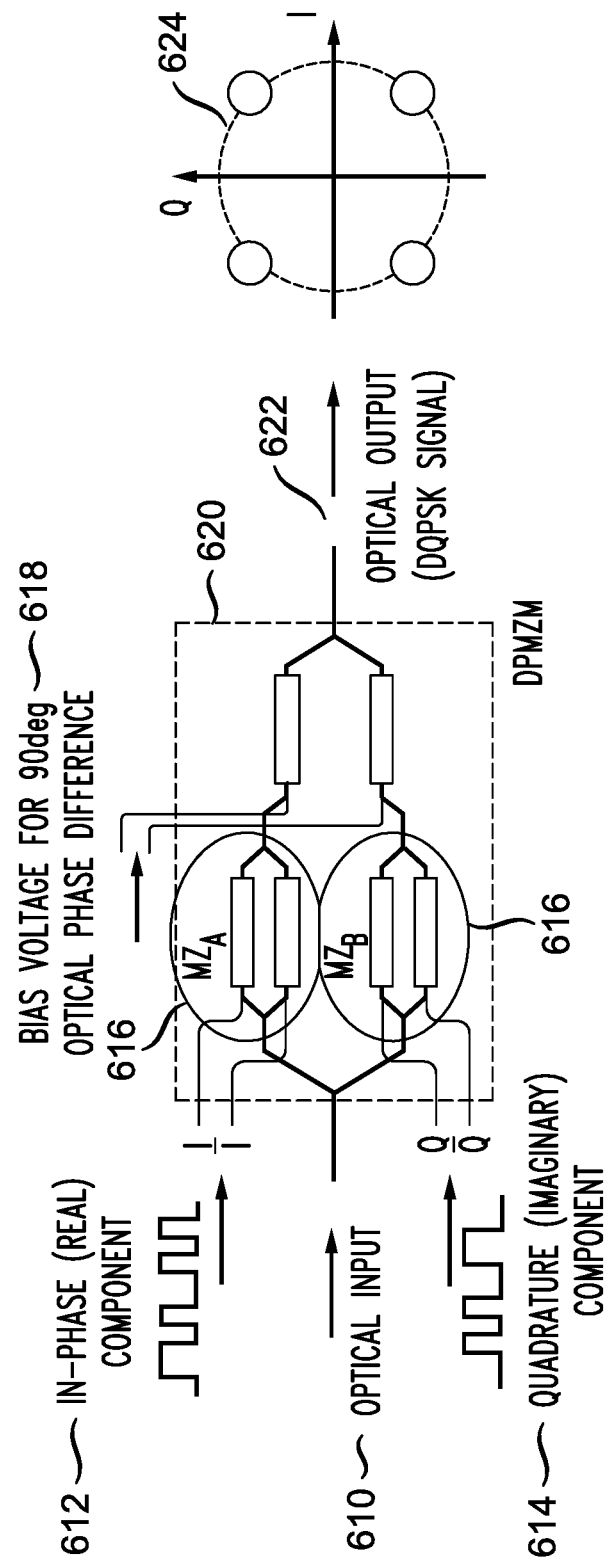
Figure 6C:
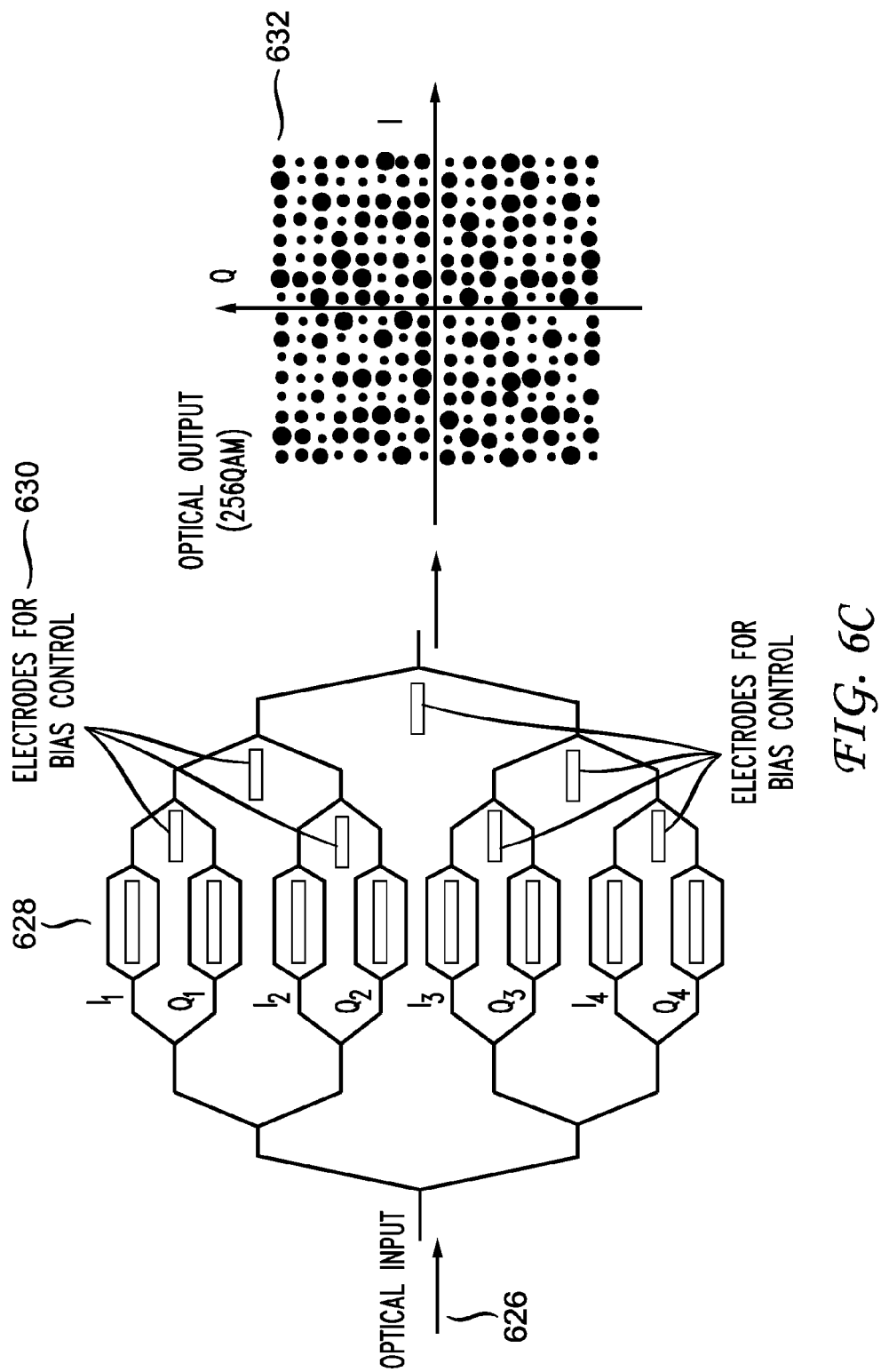

The second method by which only amplitude modulators can be used to send an I/Q signal is through the parallelization of the amplitude modulators, as illustrated in FIGS. 6A-6C. That is, the amplitude modulator is composed of multiple component amplitude modulators. As illustrated in FIG. 6A, two standard amplitude modulators 604, 606 receiving light 502 are placed monolithically in series with each respective leg of a third amplitude modulator on the same chip, with the light output 608 of each of the parallel light paths 604, 606. As illustrated, 604, 606 combined form a single amplitude modulator. 604 is a single light path with an electrode and 606 is a second light path with an opposite electrode. The light 602 is split between the two, picks up opposite phases, and when it reaches 608, the two light beams interfere, forming an amplitude signal.

For example, as illustrated in FIG. 6B, optical input 610 is received, then divided for modulation with in-phase components 612 and quadrature components 614 by parallel amplitude modulation units 616 such as that illustrated in FIG. 6A. The outputs of the parallel amplitude modulation units 616 are then communicated to a third amplitude modulator which can be monolithically in series with the parallel amplitude modulation units 616, the third amplitude modulator receiving as input a bias/signal voltage which can be, for example, 90 degrees out of phase 618. The same construction can be obtained with two amplitude modulators and two phase modulators (one phase modulator for each output leg). The optical output 622 can then be a DQPSK (Differential Quadrature Phase-Shift Keying) signal, with a resulting four quadrant I/Q lissajous 624. This pattern 620 can be repeated as many times as necessary, as illustrated in FIG. 6C. For every additional bit, each leg of the amplitude modulator 628 can have a bias/signal control electrode 630 embedded in series, generating a fuller lissajous 632. The electrodes between the various light paths can also surround each light path (instead of being in-between two light paths) to provide better control.

Another derivation to those above includes monolithically integrating a distributed feedback laser downhole with a modulator chip, such as those chips described above. The integrated laser can provide a large signal at the receiver which helps overcome any optical fiber attenuation. Such a system can greatly increase the signal power being output from the downhole location, but can often result in an increase in the number of required components downhole.

To control for drift in the fiber optic system, a pilot signal—or a signal that occurs at a lower frequency but communicated at known, set times—can be deployed to detect for amplitude and polarization drift. Although the pilot signal is output at a separate frequency from the I/Q signal, it can experience the same distortions due to drift. As the amplitude of the pilot signal is known a priori and the polarization output does not change, the drift can be determined and the subsequent data recalibrated. Due to the lack of polarization control in the downhole environment (e.g., long transmission distances, twisting and bending of the fiber optic cable, and equipment vibrations) a mismatch in polarization can result in reduced power at the receiver and other polarization sensitive equipment. The receiver can provide feedback to a polarization controller to optimize signal receive power. Such optimization can reduce the phasor data point noise and optimize data point levels, resulting in more defined data points and increasing the signal to noise ratio (SNR). The polarization controller coupled with drift control can also make it easier to implement multiple lissajous levels. For example, if, due to temperature (or other downhole conditions), phase and/or amplitude within the fiber optic communications need to be modified, having access to multiple possible modulation schemes and their resulting lissajous levels can be required for interpreting the data communicated/received. Additionally, as the DC bias of an amplitude modulator drifts with temperature at different locations downhole, the pilot signal serves as a means to ensure that the amplitude modulator stays within the linear output regime.

While various configurations have been discussed herein, it is noted that the elements of each and every configuration (or embodiment) discussed herein are exchangeable and usable within the other configurations unless expressly noted. For example, any of the configurations noted herein can have single or multiple amplitude modulators and/or single or multiple phase modulators. In addition, the various configurations noted herein can utilize single and/or multimode fiber optic cable, and can utilize single or multi-fiber configurations for communicating from the surface to downhole locations. Downhole locations can include any point below the surface of a well, including but not limited to points on the drill string, at the drill bit, wireline, slickline, coiled tubing, or other conveyances' communication points. Exemplary wavelengths for operations of the fiber optics include 850 nm-5000 nm, with preferred wavelengths including 1310 nm and 1550 nm due to low attenuation points in fiber optic cabling. Coherence length is, preferably, at least twice the distance from the surface location to the downhole location. In addition, any type of laser (but not LEDs (Light Emitting Diodes)) can be used for the various configurations described herein.

Figure 7:
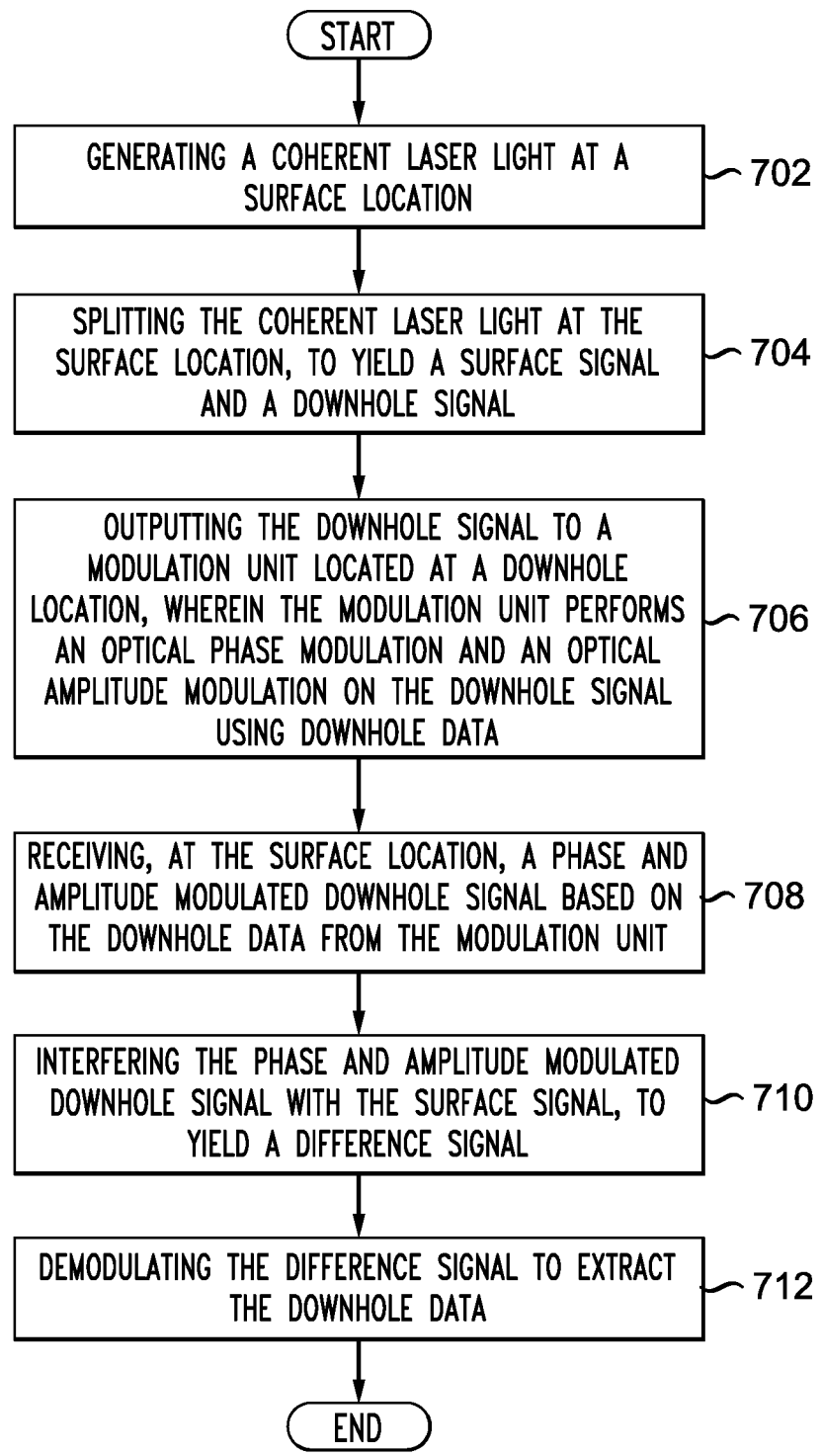
FIG. 7 illustrates an example method embodiment.
Figure 8:
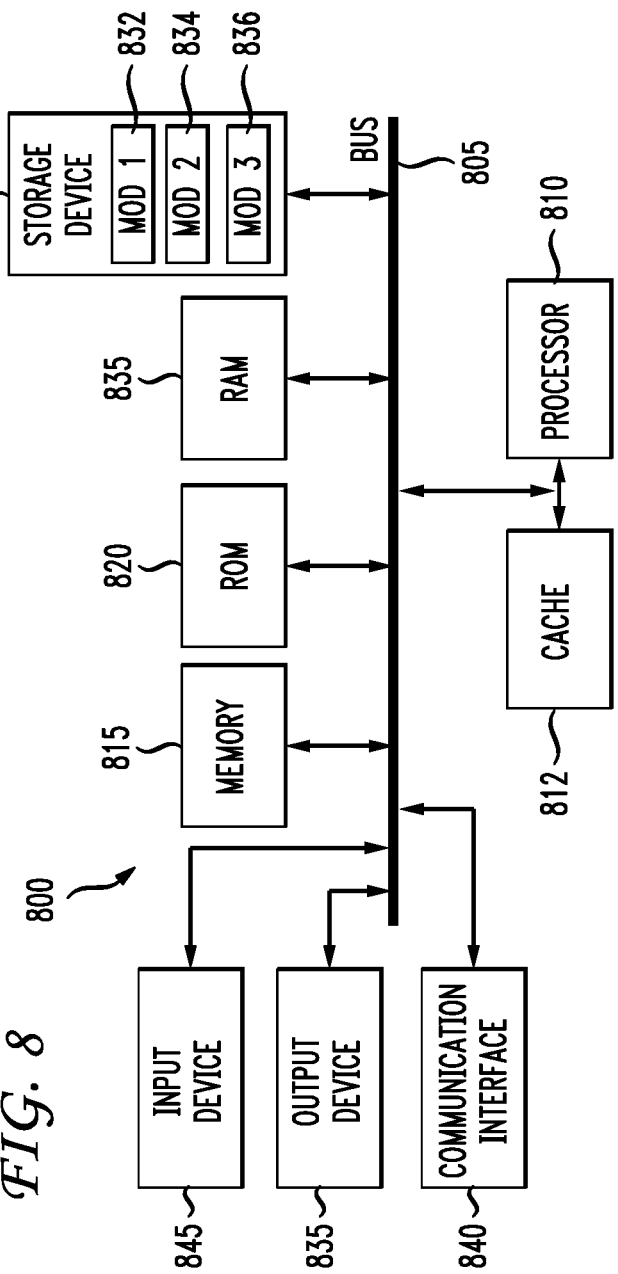
FIG. 8 illustrates an exemplary system embodiment.

FIG. 7 illustrates an example method embodiment. For the sake of clarity, the method is described in terms of an exemplary system 800 as shown in FIG. 8 configured to practice the method. The steps outlined herein are exemplary and can be implemented in any combination thereof, including combinations that exclude, add, or modify certain steps. The system 800 generates a coherent laser light at a surface location (702), and splits the coherent laser light at the surface location, to yield a surface signal and a downhole signal 704. The surface signal can be used as a local oscillator. The downhole signal is output to a modulation unit located at a downhole location, wherein the modulation unit performs an optical phase modulation and an optical amplitude modulation on the downhole signal using downhole data (706). The modulation unit can perform the optical phase modulation on the downhole signal before subsequently performing the optical amplitude modulation, or vice versa. A modulation scheme or protocol can be selected based on the amount of data to be communicated, the available bandwidth, modulation capability, etc. Exemplary modulation schemes, which can be applied include BPSK (binary phase shift keying), QPSK (quadrature phase shift keying), 8PSK (eight phase shift keying), QAM (quadrature amplitude modulation), PSK (phase shift keying), CPM (continuous phase modulation), SOQPSK (shaped offset quadrature phase shift keying), and MSK (minimum shift keying). Some of these modulation schemes allow increased data output while increasing signal complexity and/or power required. The modulation unit can be a single monolithic unit or composed of multiple pieces. In addition, the phase modulation can occur via one or more phase modulation controllers while the amplitude modulation can occur via one or more amplitude modulation controllers. When a plurality of phase and/or amplitude modulation controllers exist, the plurality of phase controllers can operate in parallel and/or in series with other phase controllers, and the plurality of amplitude controllers can likewise operate in parallel and/or in series with other amplitude controllers. The system 800 receives, from the modulation unit and at the surface location, a phase and amplitude modulated downhole signal based on the downhole data (708), which the system mixes interferometrically with the surface signal to yield a difference signal (710). The system extracts the downhole data by demodulating and possibly decoding the difference signal (712). The encoding of the optical amplitude modulation and the optical phase modulation which occur can vary based on a temperature, depth, and/or pressure at the downhole location.

A brief description of a basic general purpose system or computing device in FIG. 8 which can be employed to practice the concepts, methods, and techniques disclosed above is illustrated. With reference to FIG. 8, an exemplary system and/or computing device 800 includes a processing unit (CPU or processor) 810 and a system bus 805 that couples various system components including the system memory 815 such as read only memory (ROM) 820 and random access memory (RAM) 835 to the processor 810. The processors of FIG. 1 (i.e., the downhole processor 44, the local processor 18, and the remote processor 12, can all be forms of this processor 810. The system 800 can include a cache 812 of high-speed memory connected directly with, in close proximity to, or integrated as part of the processor 810. The system 800 copies data from the memory 815 and/or the storage device 830 to the cache 812 for quick access by the processor 810. In this way, the cache provides a performance boost that avoids processor 810 delays while waiting for data. These and other modules can control or be configured to control the processor 810 to perform various operations or actions. Other system memory 815 may be available for use as well. The memory 815 can include multiple different types of memory with different performance characteristics. It can be appreciated that the disclosure may operate on a computing device 800 with more than one processor 810 or on a group or cluster of computing devices networked together to provide greater processing capability. The processor 810 can include any general purpose processor and a hardware module or software module, such as module 1 832, module 2 834, and module 3 836 stored in storage device 830, configured to control the processor 810 as well as a special-purpose processor where software instructions are incorporated into the processor. The processor 810 may be a self-contained computing system, containing multiple cores or processors, a bus, memory controller, cache, etc. A multi-core processor may be symmetric or asymmetric. The processor 810 can include multiple processors, such as a system having multiple, physically separate processors in different sockets, or a system having multiple processor cores on a single physical chip. Similarly, the processor 810 can include multiple distributed processors located in multiple separate computing devices, but working together such as via a communications network. Multiple processors or processor cores can share resources such as memory 815 or the cache 812, or can operate using independent resources. The processor 810 can include one or more of a state machine, an application specific integrated circuit (ASIC), or a programmable gate array (PGA) including a field PGA.

The system bus 805 may be any of several types of bus structures including a memory bus or memory controller, a peripheral bus, and a local bus using any of a variety of bus architectures. A basic input/output (BIOS) stored in ROM 820 or the like, may provide the basic routine that helps to transfer information between elements within the computing device 800, such as during start-up. The computing device 800 further includes storage devices 830 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 830 can include software modules 832, 834, 836 for controlling the processor 810. The system 800 can include other hardware or software modules. The storage device 830 is connected to the system bus 805 by a drive interface. The drives and the associated computer-readable storage devices provide nonvolatile storage of computer-readable instructions, data structures, program modules and other data for the computing device 800. In one aspect, a hardware module that performs a particular function includes the software component stored in a tangible computer-readable storage device in connection with the necessary hardware components, such as the processor 810, bus 805, display 170, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 800 is a small, handheld computing device, a desktop computer, or a computer server. When the processor 810 executes instructions to perform "operations", the processor 810 can perform the operations directly and/or facilitate, direct, or cooperate with another device or component to perform the operations.

Although the exemplary embodiment(s) described herein employs the hard disk 830, other types of computer-readable storage devices which can store data that are accessible by a computer, such as magnetic cassettes, flash memory cards, digital versatile disks (DVDs), cartridges, random access memories (RAMs) 835, read only memory (ROM) 820, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 800, an input device 190 represents any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems enable a user to provide multiple types of input to communicate with the computing device 800. The communications interface 840 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 810. The functions these blocks represent may be provided through the use of either shared or dedicated hardware, including, but not limited to, hardware capable of executing software and hardware, such as a processor 810, that is purpose-built to operate as an equivalent to software executing on a general purpose processor. For example the functions of one or more processors presented in FIG. 8 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 820 for storing software performing the operations described below, and random access memory (RAM) 835 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 800 shown in FIG. 8 can practice all or part of the recited methods, can be a part of the recited systems, and/or can operate according to instructions in the recited tangible computer-readable storage devices. Such logical operations can be implemented as modules configured to control the processor 810 to perform particular functions according to the programming of the module. For example, FIG. 8 illustrates three modules Mod1 832, Mod2 834 and Mod3 836 which are modules configured to control the processor 810. These modules may be stored on the storage device 830 and loaded into RAM 835 or memory 815 at runtime or may be stored in other computer-readable memory locations.

One or more parts of the example computing device 800, up to and including the entire computing device 800, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 810 can include all types of processors disclosed herein, including a virtual processor. However, when referring to a virtual processor, the processor 810 includes the software components associated with executing the virtual processor in a virtualization layer and underlying hardware necessary to execute the virtualization layer. The system 800 can include a physical or virtual processor 810 that receive instructions stored in a computer-readable storage device, which cause the processor 810 to perform certain operations. When referring to a virtual processor 810, the system also includes the underlying physical hardware executing the virtual processor 810.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the above description, terms such as "upper," "upward," "lower," "downward," "above," "below," "downhole," "uphole," "longitudinal," "lateral," and the like, as used herein, shall mean in relation to the bottom or furthest extent of, the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicate that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Claim language reciting "at least one of" a set indicates that one member of the set or multiple members of the set satisfy the claim.

Statements of the Disclosure Include:

Statement 1: A method comprising: generating a coherent laser light at a surface location; splitting the coherent laser light at the surface location, to yield a surface signal and a downhole signal; outputting the downhole signal to a modulation unit located at a downhole location, wherein the modulation unit performs an optical phase modulation and an optical amplitude modulation on the downhole signal using downhole data; receiving, at the surface location, a phase and amplitude modulated downhole signal based on the downhole data from the modulation unit; interfering the phase and amplitude modulated downhole signal with the surface signal, to yield a difference signal; and demodulating the difference signal to extract the downhole data.

Statement 2: The method of Statement 1, wherein the modulation unit performs the optical phase modulation on the downhole signal before performing the optical amplitude modulation.

Statement 3: The method Statement 1 or Statement 2, wherein the modulation unit performs the optical amplitude modulation on the downhole signal before performing the optical phase modulation.

Statement 4: The method of any of the preceding Statements, wherein the modulation unit comprises a single monolithic unit.

Statement 5: The method according to any of the preceding Statements, wherein the optical amplitude modulation varies based on at least one of a temperature at the downhole location and time.

Statement 6: The method according to any one of the preceding Statements, wherein the modulation unit comprises at least one of a plurality of optical amplitude modulators and a plurality of optical phase modulators.

Statement 7: The method according to any one of the preceding statements, wherein the coherent laser light, the surface signal, the downhole signal, and the phase and amplitude modulated downhole signal are communicated via fiber optic cabling.

Statement 8: The method according to any one of the preceding statements, wherein the fiber optic cabling is single mode fiber.

Statement 9: The method according to any one of Statements 1-7, wherein the fiber optic cabling is multi-mode fiber.

Statement 10: The method according to any one of the preceding statements, wherein the coherent laser signal has a coherence of at least twice a distance from the surface location to the downhole location.

Statement 11: A system comprising: a laser source; a laser splitter; a modulator unit; a coherent mixer; a demodulator; a processor; and a computer-readable storage medium having instructions stored which, when executed by the processor, cause the processor to perform operations comprising: instructing the laser source to generate a coherent laser light at a surface location; splitting, via the laser splitter, the laser splitter to split the coherent laser light at the surface location, to yield a surface signal and a downhole signal; outputting the downhole signal to the modulation unit located at a downhole location, wherein the modulation unit performs an optical phase modulation and an optical amplitude modulation on the downhole signal using downhole data; receiving, at the surface location, a phase and amplitude modulated downhole signal based on the downhole data from the modulation unit; causing, via the coherent mixer, interfering of the phase and amplitude modulated downhole signal with the surface signal, to yield a difference signal; instructing the demodulator to demodulate the difference signal, thereby extracting the downhole data from the difference signal; and decoding the downhole data based on an encoding scheme of the downhole data.

Statement 12: The system of Statement 11, wherein the modulation unit performs the optical phase modulation on the downhole signal before performing the optical amplitude modulation.

Statement 13: The system according to any one of Statements 11 to 12, wherein the modulation unit performs the optical amplitude modulation on the downhole signal before performing the optical phase modulation.

Statement 14: The system according to any one of Statements 11 to 13, wherein the modulation unit comprises a single monolithic unit.

Statement 15: The system according to any one of Statements 11 to 14, wherein the optical amplitude modulation varies based on one of a temperature at the downhole location, a magnitude of an applied waveform on the downhole signal, and a value of a DC voltage bias applied to the modulation unit.

Statement 16: The system according to any one of Statements 11 to 15, wherein the modulation unit comprises at least one of a plurality of optical amplitude modulators and a plurality of optical phase modulators.

Statement 17: The system according to any one of Statements 11 to 16, further comprising fiber optic cabling; and wherein the coherent laser light, the surface signal, the downhole signal, and the phase and amplitude modulated downhole signal are communicated via the fiber optic cabling.

Statement 18: The system according to Statement 17, wherein the fiber optic cabling is single mode fiber.

Statement 19: The system according to Statement 17, wherein the fiber optic cabling is multi-mode fiber.

Statement 20: The system according to any one of Statements 11 to 19, wherein the coherent laser signal has a coherence length of at least twice a distance from the surface location to the downhole location.

Statement 21: A computer-readable storage device having instructions stored which, when executed by a computing device, cause the computing device to perform operations comprising: generating a coherent laser light at a surface location; splitting the coherent laser light at the surface location, to yield a surface signal and a downhole signal; outputting the downhole signal to a modulation unit located at a downhole location, wherein the modulation unit performs an optical phase modulation and an optical amplitude modulation on the downhole signal using downhole data; receiving, at the surface location, a phase and amplitude modulated downhole signal based on the downhole data from the modulation unit; interfering the phase and amplitude modulated downhole signal with the surface signal, to yield a difference signal; and demodulating the difference signal to extract the downhole data.

Statement 22: The computer-readable storage device of Statement 21, wherein the modulation unit performs the optical phase modulation on the downhole signal before performing the optical amplitude modulation.

Statement 23: The computer-readable storage device Statement 21 or Statement 22, wherein the modulation unit performs the optical amplitude modulation on the downhole signal before performing the optical phase modulation.

Statement 24: The computer-readable storage device of any one of Statements 21 to 23, wherein the modulation unit comprises a single monolithic unit.

Statement 25: The computer-readable storage device of any one of Statements 21 to 24, wherein the optical amplitude modulation varies based on one of a temperature at the downhole location, a magnitude of an applied waveform on the downhole signal, and a value of a DC voltage bias applied to the modulation unit.

Statement 26: The computer-readable storage device of any one of Statements 21 to 25, wherein the modulation unit comprises at least one of a plurality of optical amplitude modulators and a plurality of optical phase modulators.

Statement 27: The computer-readable storage device of any one of Statements 21 to 26, wherein the coherent laser light, the surface signal, the downhole signal, and the phase and amplitude modulated downhole signal are communicated via fiber optic cabling.

Statement 28: The computer-readable storage device of Statement 27, wherein the fiber optic cabling is single mode fiber.

Statement 29: The computer-readable storage device of of Statement 27, wherein the fiber optic cabling is multi-mode fiber.

Statement 30: The computer-readable storage device of any one of Statements 21 to 29, wherein the coherent laser signal has a coherence of at least twice a distance from the surface location to the downhole location.

Statement 31: A method comprising: generating a coherent laser light at a downhole location; splitting the coherent laser light at the downhole location, to yield a surface signal and a downhole signal; outputting the surface signal to a modulation unit located at a surface location, wherein the modulation unit performs an optical phase modulation and an optical amplitude modulation on the surface signal using surface data; receiving, at the downhole location, a phase and amplitude modulated surface signal based on the surface data from the modulation unit; interfering the phase and amplitude modulated surface signal with the downhole signal, to yield a difference signal; and demodulating the difference signal to extract the surface data.

Statement 32: A method comprising: generating a coherent laser light; splitting the coherent laser light at a first location, to yield an oscillation signal and a output signal; outputting the output signal to a modulation unit located at a second location associated with a wellbore, wherein the modulation unit performs an optical phase modulation and an optical amplitude modulation on the output signal using wellbore data; receiving, at the first location, a phase and amplitude modulated signal based on the wellbore data from the modulation unit; interfering the phase and amplitude modulated signal with the oscillation signal, to yield a difference signal; and demodulating the difference signal to extract the wellbore data.

The various embodiments described above are provided by way of illustration only and should not be construed to limit the scope of the disclosure. For example, the principles herein can be applied to any drilling operation, regardless of the composition of the communication path. Various modifications and changes may be made to the principles described herein without following the example embodiments and applications illustrated and described herein, and without departing from the spirit and scope of the disclosure.

We claim:

1. A method comprising:
   generating a coherent laser light at a surface location;
   splitting the coherent laser light at the surface location, to yield a surface signal and a downhole signal;
   outputting the downhole signal to a modulation unit located at a downhole location, wherein the modulation unit performs an optical phase modulation and an optical amplitude modulation on the downhole signal using downhole data;
   receiving, at the surface location, a phase and amplitude modulated downhole signal based on the downhole data from the modulation unit;
   interfering the phase and amplitude modulated downhole signal with the surface signal, to yield a difference signal; and
   demodulating the difference signal to extract the downhole data.

2. The method of claim 1, wherein the modulation unit performs the optical phase modulation on the downhole signal before performing the optical amplitude modulation.

3. The method of claim 1, wherein the modulation unit performs the optical amplitude modulation on the downhole signal before performing the optical phase modulation.

4. The method of claim 1, wherein the modulation unit comprises a single monolithic unit.

5. The method of claim 1, wherein the optical amplitude modulation varies based on at least one of a temperature at the downhole location and time.

6. The method of claim 1, wherein the modulation unit comprises at least one of a plurality of optical amplitude modulators and a plurality of optical phase modulators.

7. The method of claim 1, wherein the coherent laser light, the surface signal, the downhole signal, and the phase and amplitude modulated downhole signal are communicated via fiber optic cabling.

8. The method of claim 7, wherein the fiber optic cabling is single mode fiber.

9. The method of claim 7, wherein the fiber optic cabling is multi-mode fiber.

10. The method of claim 1, wherein the coherent laser light has a coherence length of at least twice a distance from the surface location to the downhole location.

11. A system comprising:
    a laser source;
    a laser splitter;
    a modulator unit;
    a coherent mixer;
    a demodulator;
    a processor; and
    a computer-readable storage medium having instructions stored which, when executed by the processor, cause the processor to initiate operations comprising:
       instructing the laser source to generate a coherent laser light at a surface location;
       splitting, via the laser splitter, the coherent laser light at the surface location, to yield a surface signal and a downhole signal;
       outputting the downhole signal to the modulation unit located at a downhole location, wherein the modulation unit performs an optical phase modulation and an optical amplitude modulation on the downhole signal using downhole data;
       receiving, at the surface location, a phase and amplitude modulated downhole signal based on the downhole data from the modulation unit;
       interfering, via the coherent mixer, the phase and amplitude modulated downhole signal with the surface signal, to yield a difference signal; and instructing the demodulator to demodulate the difference signal, thereby extracting the downhole data from the difference signal.

12. The system of claim 11, wherein the modulation unit performs the optical phase modulation on the downhole signal before performing the optical amplitude modulation.

13. The system of claim 11, wherein the modulation unit performs the optical amplitude modulation on the downhole signal before performing the optical phase modulation.

14. The system of claim 11, wherein the modulation unit comprises a single monolithic unit.

15. The system of claim 11, wherein the optical amplitude modulation varies based on at least one of a temperature at the downhole location, an input amplitude voltage, a DC bias voltage, and a time.

16. The system of claim 11, wherein the modulation unit comprises at least one of a plurality of optical amplitude modulators and a plurality of optical phase modulators.

17. The system of claim 11, further comprising fiber optic cabling; and
    wherein the coherent laser light, the surface signal, the downhole signal, and the phase and amplitude modulated downhole signal are communicated via the fiber optic cabling.

18. The system of claim 17, wherein the fiber optic cabling is single mode fiber.

19. The system of claim 17, wherein the fiber optic cabling is multi-mode fiber.

20. A computer-readable storage device having instructions stored which, when executed by a computing device, cause the computing device to initiate operations comprising:
    generation of a coherent laser light at a surface location;
    splitting the coherent laser light at the surface location, to yield a surface signal and a downhole signal;
    outputting the downhole signal to a modulation unit located at a downhole location, wherein the modulation unit performs an optical phase modulation and an optical amplitude modulation on the downhole signal using downhole data;

receiving, at the surface location, a phase and amplitude modulated downhole signal based on the downhole data from the modulation unit;

interfering the phase and amplitude modulated downhole signal with the surface signal, to yield a difference signal; and demodulating the difference signal to extract the downhole data.

* * * * *